United States Patent [19]

McMahon et al.

[11] 4,264,552
[45] Apr. 28, 1981

[54] GRANULATION OF PIGMENTS

[75] Inventors: Barry J. McMahon; Christopher Newton, both of Houston, Scotland

[73] Assignee: Ciba-Geigy Corporation, Ardsley, N.Y.

[21] Appl. No.: 950,503

[22] Filed: Oct. 11, 1978

[30] Foreign Application Priority Data

Oct. 15, 1977 [GB] United Kingdom ............... 43001/77

[51] Int. Cl.³ .............................................. C09C 1/56
[52] U.S. Cl. ............................ 264/117; 264/DIG. 51
[58] Field of Search ........................ 264/117, DIG. 51

[56] References Cited

U.S. PATENT DOCUMENTS

| 3,755,244 | 8/1973 | Hart | 264/117 |
|---|---|---|---|
| 3,880,968 | 4/1975 | Kaspar | 264/117 |
| 4,015,999 | 4/1977 | Robertson | 264/117 |
| 4,073,838 | 2/1978 | Barnickel | 264/117 |

Primary Examiner—Donald E. Czaja
Assistant Examiner—James R. Hall
Attorney, Agent, or Firm—Harry Falber

[57] ABSTRACT

The present invention provides a process for producing a substantially dry, low dusting, free-flowing granular pigment composition, comprising contacting a fluidized bed of pigment, a granulating assistant and water, and removing granules so obtained. Preferred methods include:

(a) Spraying the granulating assistant and water on to the fluidized bed of pigment; and (ii) Incorporating all or part of the granulating assistant into the pigment prior to fluidization and spraying with water, or water and the remaining granulating assistant.

14 Claims, 1 Drawing Figure

GRANULATION OF PIGMENTS

The present invention relates to the granulation of pigments in a fluid bed process.

Various fluid bed techniques are already known for the production of materials e.g. pharmaceuticals, agricultural chemicals, dyestuffs, tanning agents, optical brighteners and foodstuffs, in granular form. In a known continuous process, e.g. that described in British Patent Specification No. 1401304, a feed solution, suspension or melt, optionally containing a binder, is sprayed into a drying chamber, through which is blown hot air. Granules are formed and removed continuously; the granules being built up by spray being directed on to previously dried material and subsequent aggregation of such wetted out particles. In this continuous process, drying and granulation thus occur in a single stage.

A batch fluid-bed granulation technique has also been described in which a powder-form starting-material is introduced into a fluid bed and sprayed with a solution emulsion or dispersion of a binder material. The carrier liquid is then normally evaporated and the active material coated with the binder, granules being formed by aggregation of the coated particles.

This technique is effected on a batch basis and the starting material has been at least partly dried before introduction into the process.

Neither of these known granulation techniques have thus far been successfully applied to pigment starting materials. The reason, possibly, is that it would have been expected that such relatively severe granulation and/or drying processes, when applied to a pigment, would have had a very disadvantageous affect upon the dispersibility properties of the granular pigment particles rendering them entirely unsuitable for use.

We have now found that by employing a particular additive system, pigments can be successfully granulated in a batch fluid bed process to give products which can be readily incorporated into application media.

Accordingly, the present invention provides a process for producing a substantially dry, low dusting, free-flowing granular pigment composition, comprising contacting a fluidized bed of pigment, as additive system, a granulating assistant and water, removing granules so obtained. Preferred methods include:
(i) Spraying the granulating assistant and water on to the fluidized bed of pigment; or
(ii) Incorporating all or part of the granulating assistant into the pigment prior to fluidization and spraying with water (or water and the remaining granulating assistant.

A particularly suitable pigment powder starting material is that produced in a conventional dry grinding or sieving process. If desired, prior to use in the present process, such dry-ground pigment powder may be treated to render it more suitable for granulation e.g. by changing its surface properties by chemical means or by grinding less finely—the coarser the powder the less surface to be wetted out and bonded.

Further suitable pigment starting material can be produced from dryers which give pigment directly in powder form. Such pigment powders may be fully or partially dry and may be low dusting.

The pigment starting material may be an organic pigment or an inorganic pigment. Examples of organic pigments are azo and azomethine pigments of their metal salts or metal complexes, metal phthalocyanines which may be substituted by halogen, polycyclic pigments such as quinacridones, dioxazines, vat dyestuffs, anthraquinones and isoindolinones and salts of basic pigments precipitated with the heteropoly acids of phosphorus, tungsten, molybdenum or copper ferrocyanide. Inorganic pigments which may be used include titanium dioxide, red and yellow iron oxides, carbon black, lead and molybdenum chromes, prussian blues and cadmium reds.

The granulating assistant used in the process of the present invention may be any material or mixture of materials which:
(i) wets out the pigment powder surface sufficiently to allow agglomeration of pigment particles so wetted out, and
(ii) binds granules so formed sufficiently strongly to enable them to resist breakdown during the process and during subsequent handling and storage, but without adversely affecting dispersibility in the final application medium.

The granulating assistant should desirably also function to improve the properties of the pigment in its end application.

Examples of preferred components of the granulating assistant include surface-active agents of the non-ionic, cationic or anionic type. Surfactants, of course, serve to wet out the pigment particles in the process of the invention and, depending upon the surfactant, the pigment being granulated and the type of final application, the surfactant may also serve as a binding agent and/or a co-additive, functioning to improve the properties of the pigment.

Typical non-ionic surfactants include those falling within the following sub-groups:
(a) monoethers of polyglycols with long-chain fatty alcohols. For instance, the condensation product of from 5 to 20 moles of ethylene oxide with a C16–C18 fatty alcohol e.g. cetyl alcohol.
(b) monoesters of polyglycols with long-chain fatty acids; for instance, the condensation products of 5 to 20 moles of ethylene oxide with a fatty acid having 12 to 18 carbon atoms, for example lauric acid or stearic acid. A specific example is polyoxyethylene monolaurate.
(c) monoethers of polyglycols with alkyl-phenols; for instance the reaction production of from 5 to 20 moles of ethylene oxide with a C6–12 alkyl phenol, e.g. nonyl phenol.
(d) N,N-polyethoxylated long-chain fatty amines; for instance the reaction production of from 5 to 50 moles of ethylene oxide with a C12–C18 fatty amine e.g. cocoamine and tallow amine.
(e) N,N-polyethoxylated long-chain fatty acid amides; for instance, the reaction product of from 5 to 50 moles of ethylene oxide with hydrogenated tallow amide.
(f) ester/ethers of polyglycols with cyclic alcohols and fatty acids; specific examples are polyoxyethylene sorbitan oleate or laurate.
(g) condensation products of polyglycols e.g. the condensation product of polyoxypropylene and polyoxyethylene glycols; and
(h) glycols of alkynes e.g. acetylenic glycols.

Typical cationic surface-active agents include primary, secondary and tertiary amines and alkyl propylene diamines. These amines are typically used either as the $C_1$–$C_4$ carboxylic acid salt or as derived quaternary ammonium compounds.

The anionic surfactants may be alkali metal, ammonium or amine salts (especially voltaile amines of low molecular weight such as morpholine or triethylamine) of fatty carboxylic acids and sulphonic acids or fatty amine sulphates. Examples are alkali metal stearates, alkali metal alkyl sulphonates e.g. potassium dodecyl sulphonates; alkali metal alkaryl sulphonates e.g. sodium dodecyl benzene sulphonate; fatty acid sarcosinates; sulphonated alkyl esters of long chain fatty acids and alkyl sulphosuccinates; alkali metal salts of polyacrylic acids, sulphonated monoethers of polyglycols with alkylphenols e.g. nonylphenols; and especially the ammonium salt of partly hydrogenated wood rosin.

The surfactant component of the granulating assistant may be used alone, as a mixture of different surfactants or used in conjunction with, or replaced by, a binder and/or an applicational agent known to improve the properties of a pigment, provided that the total additive system meets the functional requirements (i) and (ii) hereinbefore described.

Water soluble polymeric agents are of particular value as binders. They may be anionic or nonionic in nature. Typical products are modified cellulose derivatives such as hydroxy ethyl cellulose, hydroxy propyl cellulose, sodium carboxymethyl cellulose, polyvinyl alcohol of varying degrees of hydrolysis from the acetate and polyvinyl pyrrolidone.

Examples of applicational agents known to enhance pigment properties in specific applications (e.g. in plastics, printing inks or paints) are abietic acid and esters thereof; (high molecular weight polyglycols e.g. polyethylene glycol 4000, diglycol monostearate, cellulose acetobutyrates; alkaline earth metal salts of fatty acids having 12 to 20 carbon atoms e.g. stearic acid; fatty acids having 12 to 20 carbon atoms; fatty alcohols; amines having 12 to 20 carbon atoms e.g. stearylamine or rosin amine; vinyl chloride polymers; vinyl chloride/vinyl acetate copolymers, polyethylene; polyacrylonitrile or polyterpene resins; dioctyl phthalate, dicyclohexyl phthalate; triglycerides of 12-hydroxystearic acid; maleic and phenolic modified resins; wood rosins modified by hydrogenation or polymerisation, and glyceryl esters of modified resins.

As already described, a part or all of the granulating assistant may be incorporated into the pigment during its preparation or may be added directly into the fluidized bed. In cases where it is preferred that the additive system is sprayed on to the bed of pigment, it is clearly an important requirement of the additive system that it is capable of being prepared as a solution, emulsion or dispersion in a carrier liquid.

The choice of the type and relative concentration of the components of the additive system depends on the functional requirements (i) and (ii) hereinbefore described and on such factors as the nature of the application (e.g. ink, plastic or paint), the nature of the pigment surface (e.g. polar/non-polar or hydrophilic/hydrophobic) and on the surface area of the pigment. The nature of the pigment and its method of production are very important in the choice of the additive system. To facilitate the granulation process, the additives previously described may also be added to the pigment at an earlier stage of the manufacturing process e.g. during or after the reaction or during drying or milling. This addition does not enable granulate formation at those stages but can make the subsequent granulation process easier e.g. by requiring lower amounts and/or elimination of one or more components from the additive system to be sprayed on.

The amount of additive system used in the process, expressed as a percentage by weight on the weight of the pigment, can be as high as 100%. However, primarily for reasons of cost, it is preferred to use amounts of additive system within the range of from 0.5 to 20% by weight, on the weight of pigment.

The liquid used to form the solution, emulsion or dispersion of the additive system is preferably all water, although a minor proportion of organic solvents may be used if desired. The presence of large quantities of an organic solvent is less preferred since, when this is vaporized, leaving the additives deposited on the pigment, the solvent may have to be recovered, thereby increasing the cost and could present a fire/explosion hazard, particularly when the possibility of hybrid mixtures of inflammable vapours and fine dusts are considered. In such cases for example, fluidization may be carried out using an inert gas.

In cases where the granulating assistant is sprayed onto the bed in conjunction with water, the concentration of the granulating assistant in the solution, emulsion or dispersion may be varied over a wide range provided that the viscosity is appropriate for easy dispensing on to the fluid bed. Concentrations which are too dilute are also disadvantageous in that longer dispensing times, longer cycle times and reduced throughputs result. In aqueous systems, the preferred concentration of the additive system is in the range of from 0.5% to 60% by weight, so long as its properties, e.g. its viscosity, make it suitable for spraying on to the bed.

Figure 1:
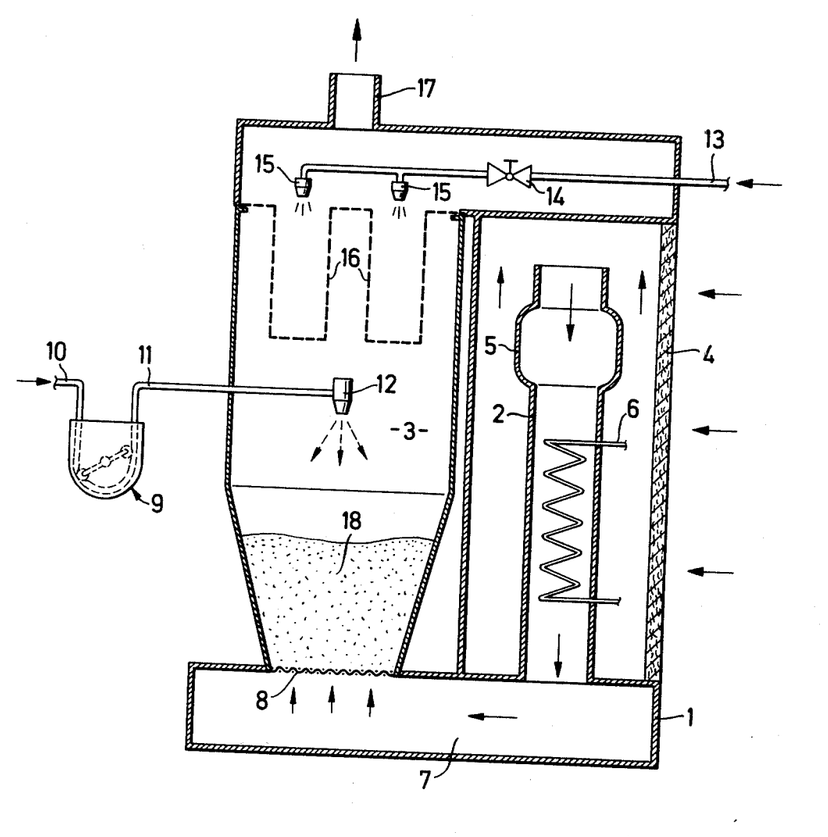

In one embodiment, the process of the invention is carried out on a batchwise basis, in a machine of the type described in FIG. 1 of the accompanying drawing.

In order that the invention may be better understood, and its preferred features explained, a preferred embodiment of the invention will now be described with reference to the accompanying drawing which is a diagrammatic side view, partly in section, of an apparatus for carrying out the process of the invention.

The apparatus comprises a container 1, consisting of an air-heating compartment 2 and, interconnected therewith, a fluid bed compartment 3. The air-heating compartment 2 is equipped with an air filter 4, a suction fan 5 and a heater 6. In an alternative apparatus (not shown), fan 5 is situated in outlet port 17 so that air is drawn rather than forced through the fluid bed. Compartments 2 and 3 are connected by a duct 7 having an air distributor plate 8, forming a partition with the fluid bed compartment 3.

The fluid bed compartment 3 has a spray unit comprising a metering pump 9, with an inlet 10 for a solution, emulsion or dispersion of the granulating assistant and an outlet 11 leading to a nozzle head 12. Above the nozzle head 12 are situated filter bags 16 to retain the material to be granulated within the fluid bed compartment 3. Above the bag filters, there is situated a filter bag cleaning unit comprising an inlet 13, a timer 14 and air jets 15. Alternatively, the bag filters may be cleaned by a shaking device. At the top of the fluid bed compartment 3 there is an air exhaust port 17. The material to be granulated is placed at the bottom of the fluid bed compartment 3, in the space 18.

The process of the invention is carried out using the apparatus illustrated, as follows:

Dry or semi-dry pigment powder, with or without additives as desired is charged into space 18 of the fluid bed compartment 3. Hot air produced in compartment 2 is blown through the pigment powder to fluidise it. The inlet air temperature at the fluid bed is within the range 50° to 150° C., normally 60° to 120° C.; and the outlet air temperature from the bed is in the range 25° to 120° C., depending upon the inlet temperature, the additive system and the rate of dispensation of the latter. The rate of air flow through the fluid bed is adjusted to give suitable fluidization of the powder. The rate of the air flow will vary depending upon such factors as machine size, batch size, pigment particle size and density. For a given system it can also be varied during the granulation cycle e.g. as the pigment particle size, shape and density change progressively and thereby change in fluidization characteristics.

Air is turned on to the filter bag cleaning unit, allowing a periodic air pulse to blow off any pigment adhering to the filter bags 16. Fine dust is therefore continually removed and returned to the fluidized granulation space 18.

Granules are formed by spraying water or a solution emulsion or suspension of an additive system into the fluidized granulation space 18. The material to be sprayed is metered to the nozzle head 12 whereat it is atomized with or without compressed air depending on nozzle design. Spraying time can vary depending upon the additive system concentration in the spray; the amount of additive system required; the form of the pigment; the rate of air flow; and the temperature. Normally however, the spraying time will be within the range of from 10 minutes to 2 hours.

After granule formation is complete, fluidization is normally continued for a further period e.g. 1 to 30 minutes, to complete drying to the required degree. This may be effected at a temperature lower than that used in the granulating process to avoid over-heating the product.

Finally, the granulates formed are removed from the fluid bed space 18.

The products of the process of the present invention are substantially dry (containing not more than 2% by weight of water in most cases), low dusting, easily handleable free-flowing, meterable pigment granules which enable working environments to be cleaner and more free of health hazards.

The following Examples further illustrate the present invention. In the Examples, the term "binder" is used to denote the total additive system.

EXAMPLE 1

Dry pigment powder was charged to the container of the apparatus as shown in the FIGURE. The process can be summarised as follows:

(a) Process Conditions

Inlet Temperature: 110° C.
Outlet Temperature: 30° C.
Pigment Charge: 250 parts (by weight) of CI Pigment Yellow 13
Binder: 500 parts (by weight) of composition:
5.0% ATLOX 1087 (polyoxyethylene sorbitan oleate)
0.25% KLUCEL M(hydroxypropyl cellulose)
94.75% WATER
Spraying Time: 2 hours
Drying Time: 10 minutes (b) Product Composition 90.5% CI Pigment Yellow 13
9.0% ATLOX 1087
0.5% KLUCEL M (c) Physical Appearance
A low dusting, free flowing granular product having the following size distribution:

| <75μ | 75–125 μ | 125–180 μ | 180–250 μ | 250–355 μ | 355–500 μ | 500–600 μ | 600–850 μ | 850–1180 μ | 1180–2500 μ |
|---|---|---|---|---|---|---|---|---|---|
| 1.0% | 5.0% | 9.5% | 19.0% | 20.5% | 18.5% | 8.0% | 11.0% | 5.5% | 2.0% |

(Size in Microns)

(d) Application Properties

The Application properties of the granules and the starting powder were then compared by incorporating equal amounts of pigment in each case into a decorative alkyd paint medium. The resulting paints were then examined and, within practical limits, no differences in applicational properties were observed.

EXAMPLE 2

Dry pigment powder was granulated in the apparatus shown in the FIGURE. The process details were as follows:

(a) Process Conditions

Inlet Temperature: 110° C.
Outlet Temperature: 30° C.
Pigment Charge: 250 parts (by weight) of CI Pigment Yellow 13
Binder: 500 parts (by weight) of composition:
4.5% STAYBELITE RESIN (hydrogenated wood rosin)
0.5 KLUCEL M (hydroxy propyl cellulose)
2.75% NH$_3$ solution (SG=0.880)
92.25% WATER
Spraying Time: 2 hours
Drying Time: 10 minutes (b) Product Composition 90.9% CI Pigment Yellow 13
8.2% STAYBELITE RESIN (hydrogenated wood rosin)
0.9% KLUCEL M

(c) Physical Appearance
A low dusting, free flowing granular product having the following size distribution:

| <75μ | 75–125 μ | 125–180 μ | 180–250 μ | 250–355 μ | 355–500 μ | 500–600 μ | 600–850 μ | 850–1180 μ | 1180–2500 μ |
|---|---|---|---|---|---|---|---|---|---|
| 1.0% | 10.0% | 12.5% | 20.0% | 22.5% | 18.0% | 8.0% | 6.5% | 1.5% | — |

(Size in Microns)

(d) Application Properties

The application properties of the granules and the starting powder were then compared by incorporating equal amounts of pigments into lithographic ink medium. The resulting inks were then examined and, within practical limits, no differences in applicational properties were observed.

EXAMPLE 3

Dry pigment powder was charged to the container of the apparatus shown in the FIGURE. The process details are as follows:

(a) Process Conditions

Inlet Temperature: 110° C.
Outlet Temperature: 30° C.
Pigment Charge: 250 parts (by weight) of CI Pigment Yellow 13
Binder: 500 parts (by weight) of composition:
5% LISSAPOL NX(ethoxylated nonyl phenol)
95% WATER
Spraying Time: 2 hours
Drying Time: 10 minutes.

(b) Pigment Composition

91% CI Pigment Yellow 13
9% LISSAPOL NX

(c) Physical Appearance
A low dusting, free flowing granular product having the following size distribution:

| 0–75μ | 75–125 μ | 125–180 μ | 180–250 μ | 250–355 μ | 355–500 μ | 500–600 μ | 600–850 μ | 850–1180 μ | 1180–2500 μ |
|---|---|---|---|---|---|---|---|---|---|
| 10.5% | 8.5% | 7.5% | 10.5% | 13.0% | 13.0% | 10.5% | 14.0% | 8.5% | 4.0% |

(Size in Microns)

(d) Application Properties

The application properties of the granules and the starting powder were then compared by incorporating equal amounts of pigment into an acrylic ink medium. The resulting inks were then examined and, within practical limits, no differences in applicational properties were observed.

EXAMPLE 4

Dry pigment powder was charged to the container shown in the Figure. The process details are as follows:

(a) Process Conditions

Inlet Temperature: 110° C.
Outlet Temperature: 28° C.
Pigment Charge: 250 parts (by weight) of CI Pigment Yellow 13
Binder: 250 parts (by weight) of composition:
10.0% ATLOX 1087 (polyoxyethylene sorbitan oleate)
0.5% KLUCEL M (hydroxy propyl cellulose)
89.5% WATER
Spraying Time: 30 minutes
Drying Time: 10 minutes

(b) Production Composition 90.5% CI Pigment Yellow 13
9.0% ATLOX 1087
0.5% KLUCEL M

(c) Physical Appearance
A low dusting, free flowing granular product having the following size distribution:

| 0–75μ | 75–125 μ | 125–180 μ | 180–250 μ | 250–355 μ | 355–500 μ | 500–600 μ | 600–850 μ | 850–1180 μ | 1180–2500 μ |
|---|---|---|---|---|---|---|---|---|---|
| 0.5% | 1.5% | 3.0% | 7.5% | 12.5% | 19.0% | 16.0% | 24.0% | 15.0% | 1.0% |

(Size in Microns)

(d) Application Properties

The application properties of the granules and starting powder were then compared by incorporation of equal amounts of pigment into a decorative alkyd paint medium. The resulting paints were then examined and, within practical limits, no difference in applicational properties were observed.

EXAMPLE 5

Dry pigment powder was charged to the apparatus shown in the Figure. The process details were as follows:

(a) Process Conditions

Inlet Temperature: 110° C.
Outlet Temperature: 40° C.

Pigment Charge: 250 parts (by weight) of CI Pigment Blue 15.3
Binder: 500 parts (by weight) of composition:
1.5% ATLOX 1087
0.5% KLUCEL M
0.5% LISSAPOL NX (Ethoxylated nonyl phenol)
97.5% WATER
Spraying Time: 2.5 hours
Drying Time: 10 minutes (b) Product Composition 95.1% CI Pigment Blue 15.3
2.9% ATLOX 1087
1.0% KLUCEL M
1.0% LISSAPOL NX (c) Physical Appearance
A low dusting, free flowing granular product having the following size distribution:

| 0-75 μ | 75-125 μ | 125-180 μ | 180-250 μ | 250-355 μ | 355-500 μ | 500-600 μ | 600-850 μ | 850-1180 μ | 1180-2500 μ |
|---|---|---|---|---|---|---|---|---|---|
| 2.5% | 4.5% | 4.5% | 9.0% | 9.0% | 3.5% | 2.5% | 6.0% | 18.0% | 40.5% |

(All sizes in Microns)

(d) Application Properties

The application properties of the granules and the starting powder were then compared by incorporating equal amounts of pigment into an industrial paint (Alkyd Melamine) medium. The resulting paints were examined and, within practical limits, no differences in applicational properties were observed.

EXAMPLE 6

Dry pigment powder was charged to the apparatus shown in the Figure. The process details are as follows:

(a) Process Conditions

Inlet Temperature: 110° C.
Outlet Temperature: 30° C.
Pigment Charge: 250 parts (by weight) of CI Pigment Red 57.1
Binder: 500 parts (by weight) of composition:
1.75% ATLOX 1087
0.25% KLUCEL M
0.5% SOLUMIN F10S (Na salt of sulphated polyoxyalkylene polyoxyethane)
97.5% WATER
Spraying Time: 2 hours
Drying Time: 15 minutes (b) Product Composition 95.2% CI Pigment Red 57.1
3.3% ATLOX 1087
0.5% KLUCEL M
1.0% SOLUMIN F10S (d) Application Properties The application properties of the granules and starting powder were then compared by incorporating equal amounts of pigment into an industrial paint (Alkyd Melamine) medium. The resulting paints were then examined and, within practical limits, no differences in application properties were observed.

EXAMPLE 7

250 parts (by weight) of CI Pigment Yellow 13 are charged to the container (see FIG. 1). The pigment powder is then fluidized with hot air (100° C.±10° C.) and the outlet temperature allowed to rise to approx. 30° C. 250 parts (by weight) of binder of composition:
5.0% Ethoxylated fatty alcohol(Emulan OG)
0.1% Hydroxy propyl cellulose(Klucel M)
5.0% Hydrogenated wood rosin(Stabyelite Resin)
3.0% NH$_3$ solution (Sg=0.880)
86.9% Water
are then sprayed onto the fluidized bed of pigment uniformly over a period of 1 hour. Fluidization is continued for a further 5 minutes. The resulting granules, of composition (by weight),
90.9% CI Pigment Yellow 13
4.5% Ethoxylated fatty alcohol
0.1% Hydroxy propyl cellulose
4.5% Hydrogenated wood rosin
had a size distribution similar to that obtained in Example 4.

The granules and Original powder were then compared by incorporating equal amounts of pigment into a nitrocellulose ink.

The resulting inks were then examined and, within practical limits, no differences in application properties were observed.

EXAMPLE 8

250 parts (by weight) of CI Pigment Yellow 13 are charged to the container (see FIG. 1). The pigment powder is then fluidized with hot air (100° C.±10° C.) and the outlet temperature allowed to rise to approx. 30° C. 250 parts (by weight) of binder of composition:
1.0% Na salt of sulphated polyoxyalkylene condensate (Solumin FIOS at 100%)
6.5% Potassium salt of polymethacrylic acid (Vinapol 1640)
6.7% Glycerol ester of hydrogenated wood rosin (Dresinol 303 at 100%)

(c) Physical Appearance
A low dusting, free flowing granular product having the following size distribution:

| 0-75 μ | 75-125 μ | 125-180 μ | 180-250 μ | 250-355 μ | 355-500 μ | 500-600 μ | 600-850 μ | 850-1180 μ | 1180-2500 μ |
|---|---|---|---|---|---|---|---|---|---|
| 1.25% | 11.0% | 17.0% | 27.25% | 29.5% | 7.5% | 4.0% | 2.5% | — | — |

(Size in Microns)

91.8% Water are then sprayed onto the fluidized bed of pigment uniformly over a period of 1¼ hours. Fluidization is continued for a further 10 minutes. The resulting granules, of composition (by weight), 92.4% CI Pigment Yellow 13
0.9% Na salt of sulphated polyoxyalkylene condensate
0.5% K salt of polymethacrylic acid
6.2% Glycerol ester of hydrogenated wood rosin.

had a size distribution similar to that obtained in Example 2. The granules and Original powder were then compared by incorporating equal amounts of pigment into an industrial paint (Alkyd Melamine) medium. The resulting paints were then examined and, within limits, no differences in application properties were observed.

EXAMPLE 9

250 parts (by weight) of CI Pigment Yellow 13 are charged to the container (See FIG. 1). The pigment powder is then fluidized with hot air (100°±10° C.) and the outlet temperature allowed to rise to approx. 30° C. 500 parts (by weight) of binder composition:

2.0% Ethoxylated nonyl phenol (Lissapol NX)
0.3% Hydroxy propyl cellulose(Klucel M)
3.0% Maleic modified resin(Pentalyn 255)
1.8% $NH_3$Solution(SG=0.830)
92.9% Water are then sprayed onto the fluidized bed of pigment uniformly over a period of 2 hours. The resulting granules, of composition (by weight),
90.5% CI Pigment Yellow 13
3.6% Ethoxylated nonyl phenol
0.5% Hydroxy propyl cellulose
5.4% Maleic modified resin had a size distribution similar to that obtained in Example 3.

The granules and Original powder were then compared by incorporating equal amounts of pigment into a nitrocellulose ink The resulting inks were then examined and, within practical limites, no differences in application properties were observed.

EXAMPLE 10

250 parts (by weight) of CI Pigment Yellow 13 are charged to the container (See FIG. 1). The pigment powder is then fluidized with hot air (100° C.±10° C.) and the outlet temperature allowed to rise to approx. 30° C. 300 parts (by weight) of binder of composition:

5.5% $C_{18}$ Fatty amine(Crodamine IT)
0.4% Polyvinyl alcohol(Elvanol 50.42)
2.5% Ethoxylated fatty amine(Catafor 09)
91.6% Water are then sprayed onto the fluidized bed of pigment uniformly over a period of 1 hour. Fluidization is continued for a further 5 minutes. The resulting granules, of composition (by weight).

90.8% CI Pigment Yellow 13
6.0% $C_{18}$ Fatty amine
0.5% Polyvinyl alcohol
2.7% Ethoxylated fatty amine had a size distribution similar to that obtained in Example 4.

The granules and Original powder were then compared by incorporating equal amounts of pigment into a nitrocellulose ink.

The resulting inks were then examined and, within practical limits, no differences in application properties were observed.

EXAMPLE 11

250 parts(by weight) of CI Pigment Yellow 109 are charged to the container (See FIG. 1). The pigment powder is then fluidized with hot air (100° C.±10° C.) and the outlet temperature allowed to rise to approx. 30° C. 500 parts (by weight) of binder of composition:

0.25% Hydroxy ethyl cellulose (Natrosol 250HR)
4.00% Hydrogenated wood rosin (Staybelite Resin)
2.45% $NH_3$ Solution(Sg=0.880)
1.00% Sodium dioctyl sulphosuccinate(Anonaid TH at 100%)
92.30% Water are then sprayed onto the fluidized bed of pigment uniformly over a period of 2 hours. Fluidized is continued for a further 10 minutes. The resulting granules of composition (by weight)

90.5% CI Pigment Yellow 109
7.2% Hydrogenated wood rosin
0.5% Hydroxy ethyl cellulose
1.8% sodium dioctyl sulphosuccinate had a size distribution similar to that obtained in Example 5.

The Dust Indices (as described and explained in British Patent Specification No. 1449283) were measured and the following results were obtained: granules of Example 11 (Dust Index=19); original pigment powder (Dust Index=23).

EXAMPLE 12

250 parts(by weight) of CI Pigment Yellow 109 are charged to the container (see FIG. 1). The pigment powder is then fluidized with hot air (100° C.±10° C.) and the outlet temperature allowed to rise to approx. 30° C. 350 parts (by weight) of binder of composition:

2.9% Polyoxypropylene Polyoxyethylene copolymer (MW 8500) (Supronic E800)
0.4% Hydroxypropyl cellulose (Klucel M)
4.3% Unsaturated C18 fatty alcohol(Oleyl alcohol)
92.4% water are then sprayed onto the fluidized bed of pigment uniformly over a period of 1.25 hours. Fluidization is continued for a further 10 minutes. The resulting granules, of composition (by weight):

90.4% CI Pigment Yellow 109
3.7% Polyoxypropylene/polyoxyethylene copolymer
0.5% Hydroxy propyl cellulose
5.4% Unsaturated C18 fatty alcohol had a Dust Index of 6 (Original powder 23) had a size distribution similar to that obtained in Example 5. The granules and Original powder were then compared by incorporating equal amounts of pigment into an industrial paint medium (Alkyl melamine).

The resulting paints were then examined and, within practical limits, no differences in application properties were observed.

EXAMPLE 13

250 parts (by weight) of CI Pigment Yellow 109 are charged to the container (See FIG. 1). The pigment powder is then fluidized with hot air (100° C.±10° C.) and the outlet temperature allowed to rise to approx. 30° C. 250 parts(by weight) of binder of composition:

3.0% Sodium lauroyl sarcosinate(Sarkosyl NL 35 at 100%
0.25% Hydroxy ethyl cellulose(Natrosol 250 HR)
7.0% Triglyceride of 12 hydroxy stearic acid (Synthawax)
89.75% Water are then sprayed onto the fluidized bed of pigment uniformly over a period of 1 hour. Fluidization is continued for a further 5 minutes. The resulting granules, of composition (by weight).

90.7% CI Pigment Yellow 109
2.7% Sodium lauroyl sarcosinate
0.2% Hydroxy ethyl cellulose
6.4% Triglyceride of 12-hydroxy stearic acid had a Dust Index of 13 (Original powder 23) and had a size distribution similar to that obtained in Example 3. The granules and Original powder were then compared by incorporating equal amounts of pigment into a plasticised PVC.

The resulting PVC hides were then examined and, within practical limits, no differences in application properties were observed.

EXAMPLE 14

250 parts (by weight) of CI Pigment Yellow 62.1 are charged to the container (See FIG. 1). The pigment powder is then fluidized with hot air (100°±10° C.) and the outlet temperature allowed to rise to approx. 30° C. 200 parts (by weight) of binder of composition:

3.8% Sodium dioctyl sulphosuccinate (Anonaid TH at 100%)
1.3% Polyvinyl pyrrolidone (Aldacol at 100%)
8.0% Dioctyl phthalate (Reomol D79P)
8.1% Water are then sprayed onto the fluidized bed of pigment uniformly over a period of 3/4 hour. Fluidization is continued for a further 10 minutes. The resulting granules, of composition (by weight), 90.1% CI Pigment Yellow 62.1
2.7% Sodium dioctyl sulphosuccinate
0.9% Polyvinyl pyrrolidine
6.3% Dioctyl phthalate had a Dust Index of 18 (Original powder 30) had a size distribution similar to that obtained in Example 6. The granules and Original powder were then compared by incorporating equal amounts of pigment into plasticised PVC.

The resulting PVC hides were then examined and, within practical limits, no differences in application properties were observed.

EXAMPLE 15

250 parts (by weight) of CI Pigment Yellow 62.1 are charged to the container (See FIG. 1). The pigment powder is then fluidized with hot air (100° C.±10° C.) and the outlet temperature allowed to rise to approx. 30° C. 350 parts (by weight) of binder of composition:

5.0% Sorbitan tristearate (Span 65)
0.7% Hydroxy propyl cellulose (klucel M)
2.1% Cyclohexyl phthalate (Howflex CP)
92.2% Water are then sprayed onto the fluidized bed of pigment uniformly over a period of 1½ hours fluidization is continued for a further 5 minutes.

The resulting granules, of composition (by weight),
90.1% CI Pigment Yellow 62.1
6.3% Sorbitan tristearate
0.9% Hydroxy propyl cellulose
2.7% Cyclohexyl phthalate had a size distribution similar to that obtained in Example 2.

The granules and Original powder were then compared by incorporating equal amounts of pigment into a decorative alkyd paint medium.

The resulting paints were then examined and, within practical limits, no differences in application properties were observed.

EXAMPLE 16

250 parts (by weight) of CI Pigment Yellow 62.1 are charged to the container (See FIG. 1). The pigment powder is then fluidized with hot air (100° C.±10° C.) and the outlet temperature allowed to rise to approx. 30° C.

250 parts (by weight) of binder of composition:
4.0% Phosphate ester of a polyoxyalkylene condensate (Solumin PEN 60)
0.5% Polyvinyl pyrrolidone (Aldacol at 100%)
6.0% Saturated C18 fatty acid(Isostearic acid)
89.5% Water and then sprayed onto the fluidized bed of pigment uniformly over a period of 2 hours. Fluidized is continued for a further 5 minutes. The resulting granules, of composition (by weight), 90.5% CI Pigment Yellow 62.1
3.6% Phosphate ester of a polyoxyalkylene condensate
0.5% Polyvinyl pyrrolidone
5.4% fatty Saturated C18 fatty acid had a Dust Index of 14 (Original powder 30) and had a size distribution similar to that obtained in Example 6. The granules and Original powder were then compared by incorporating equal amounts of pigment into a decorative, alkyd paint medium.

The resulting paints were then examined and, within practical limits, no difference in application properties were observed.

EXAMPLE 17

260 parts (by weight) of CI Pigment Yellow 13 previously treated with 10 parts (by weight) of abiethylamine (Rosin Amine D) are charged to the container (See FIG. 1).

The pigment powder is then fluidized with hot air (100° C.±10° C.) and the outlet temperature allowed to rise to approx. 30° C. 350 parts (by weight) of binder of composition:

0.7% Sodium N-methyl N-oleyl laurate (Adinol T at 100%)
0.4% Sodium carboxy methyl cellulose
3.6% Maleic modified resin (Pentalyn 255)
2.2% $NH_3$ Solution (SG=0.880)
93.1% Water are then sprayed onto the fluidized bed of pigment uniformly over a period of 2 hours. Fluidization is continued for a further 5 minutes. The resulting granules, of composition (by weight):

90.4% CI Pigment Yellow 13
3.6% Abietylamine
4.6% Maleic modified Resin
0.9% Sodium-N-methyl-N-oleyl laurate
0.5% Sodium carboxy methyl cellulose had a size distribution similar to that obtained in Example 4.

The granules and Original powder were then compared by incorporating equal amounts of pigment into an industrial paint medium (alkyd melamine).

The resulting paints were then examined and, within practical limits, no differences in application properties were observed.

EXAMPLE 18

260 parts (by weight) of CI Pigment Yellow 13 which had been previously treated with 10 parts (by weight) of abiethylamine (Rosin Amine D) are charged to the container (See FIG. 1). The pigment powder is then fluidized with hot air (100° C.±10° C.) and the outlet temperature allowed to rise to approx. 30° C. 250 parts (by weight) of binder of composition:

- 0.5% Hydroxy propyl cellulose (Klucel M)
- 6.0 C6-C18 Fatty amine acetate (Armac C)
- 4.0% Unsaturated C18 fatty alcohol (Oleyl alcohol)
- 89.5% Water are then sprayed onto the fluidized bed of pigment uniformly over a period of 2 hours. Fluidization is continued for a further 5 minutes. The resulting granules, of composition (by weight),

- 87.4% CI Pigment Yellow 13
- 3.5% Abiethylamine
- 5.2% C6-C18 fatty amine acetate
- 3.5% Unsaturated C18 fatty alcohol
- 0.4% Hydroxy propyl cellulose had a Dust Index of 30 (Original powder 78) and had a size distribution similar to that obtained in Example 3.
The granules and Original powder were then compared by incorporating equal amounts of pigment into an industrial paint medium (alkyd melamine).
The resulting paints were then examined and, within practical limits, no differences in application properties were observed.

EXAMPLE 19

260 parts (by weight) of CI Pigment Yellow 13 which had been previously treated with 10 parts (by weight) of abiethylamine (Rosin Amine D) and 15 parts (by weight) of sodium alkyl naphthalene sulphonate (Altamol NNO) are charged to the container (See FIG. 1). The pigment powder is then fluidized with hot air (100° C.+10° C.) and the outlet temperature allowed to rise to approx. 30° C. 250 parts (by weight) of binder of composition:

- 0.5% Hydroxy ethyl cellulose (Natrosol 250 HR)
- 99.5% Water are then sprayed onto the fluidized bed of pigment uniformly over a period of 1½ hours. Fluidization is continued for a further 10 minutes. The resulting granules, of composition (by weight):

- 90.5% CI Pigment Yellow 13
- 3.6% Abiethylamine
- 5.4% Sodium alkyl naphthalene sulphonate
- 0.5% Hydroxy ethyl cellulose had a size distribution similar to that obtained in Example 2.
The granules and Original powder were then compared by incorporating equal amounts of pigment into an industrial paint medium (alkyd melamine).
The resulting paints were then examined, and, within practical limits, no differences in application properties were observed.

EXAMPLE 20

250 Parts (by weight) of CI Pigment Yellow 129 are charged to the container (See FIG. 1). The pigment powder is then fluidized with hot air (100° C.±10° C.) and the outlet temperature allowed to rise to approx, 30° C. 500 parts (by weight) of binder of composition:

- 0.5% Klucel 'M' (Hydroxy propyl cellulose)
- 2.5% Duomac 'T' (Acetate of tallow propylene diamine)
- 2.5% Oleyl alcohol
- 94.5% Water are then sprayed onto the fluidized bed of pigment uniformly over a period of 2 hours. Fluidization is continued for a further 10 minutes. The resulting granules, of composition (by weight):
- 90.1% CI Pigment Yellow 129
- 0.9% Klucel 'M'
- 4.5% Duomac 'T'
- 4.5% Oleyl alcohol had a size disttribution similar to that obtained in Example 4.
The granules and Original powder were then compared by incorporating equal amounts of pigment into an industrial paint medium (Alkyd melamine).
The resulting paints were then examined and, within practical limits, no differences in application properties were observed.

EXAMPLE 21

250 parts (by weight) of CI Pigment Yellow 129 are charged to the container (See FIG. 1). The pigment powder is then fluidized with hot air (100° C.±10° C.) and the outlet temperature allowed to rise to approx. 30° C. 350 parts (by weight) of binder of composition:

- 0.4% Natrosol 250 HR (Hydroxy ethyl cellulose)
- 5.0% Staybelite resin (Hydrogenated wood rosin)
- 2.1% Supronic E800 (Polyoxypropylene/polyoxyethylene copolymer (MW 8500)
- 3.0% NH3 solution (SG 0.880)
- 89.5% Water are then sprayed onto the fluidized bed of pigment uniformly over a period of 1½ hours. Fluidization is continued for a further 5 minutes. The resulting granules, of composition (by weight):

- 90.5% CI Pigment Yellow 129
- 0.5% Natrosol 250 HR
- 6.3% Staybelite resin
- 2.7 Supronic E800 had a Dust Index of 19 (Original powder 66) and a size distribution similar to that obtained in Example 3.
The granules and Original powder were then compared by incorporating equal amounts of pigment into an industrial paint medium (Alkyd melamine).
The resulting paints were then examined and, within practical limits, no differences in application properties were observed.

EXAMPLE 22

293 parts (by weight) of CI Pigment Yellow 1 powder of which 30.6 parts (by weight) are water and 12.4 parts Solumin FIOS at 100% (sodium salt of sulphated polyoxyalkylene condensate) are charged to the container (see FIG. 1). The pigment powder is then fluidized with hot air (100° C.±10° C.) and the outlet temperature allowed to rise to approx. 30° C. 200 parts (by weight) of binder of composition:

- 0.6% Natrosol 250 HR (Hydroxy ethyl cellulose)

6.3% Dresinol 303 at 100% (an aqueous dispersion of glycerol ester of hydrogenated wood rosin)
93.1% Water are then sprayed onto the fluidized bed of pigment uniformly over a period of 1½ hours. Fluidization is continued for a further 5 minutes. The resulting granules, of composition (by weight):

90.5% CI Pigment Yellow 1
0.4% natrosol 250 HR.
4.6% Glycerol ester of hydrogenated wood rosin
4.5% Solumin FIOS at 100% had a Dust Index of 6 (Original powder 78) and a size distribution similar to that obtained in Example 3. The granules and Original powder were then compared by incorporating equal amounts of pigment into a nitrocellulose ink.

The resulting inks were then examined and the ink prepared from the granules had improved strength and gloss.

EXAMPLE 23

293 parts (by weight) of CI Pigment Yellow 1 powder of which 30.6 parts (by weight) are water and 12.4 parts by weight are Solumin FIOS as 100% sodium salt of sulphated polyoxyalkylene condensate) are charged to the container (see FIG. 1). The pigment powder is then fluidized with hot air (100° C.±10° C.) and the outlet temperature allowed to rise to approx. 30° C. 250 parts (by weight) of binder of composition:

0.5% Klucel M (Hydroxy propyl cellulose)
5.0% Staybelite Resin (Hydrogenated wood rosin)
3.0% NH$_3$ solution (SG=0.880)
91.5% Water are then sprayed onto the fluidized bed of pigment uniformly over a period of 1 hour. Fluidization is continued for a further 10 minutes. The resulting granules, of composition (by weight):

90.5% CI Pigment Yellow 1
0.5% Klucel M
4.5% Staybelite Resin
4.5% Solumin FIOS had a Dust Index of 4 (Original powder 78) and a size distribution similar to that obtained in Example 6.

The granules and Original powder were then compared incorporating equal amounts of pigment into a nitrocellulose ink.

The resulting inks were then examined and, within practical limits, no differences in application properties were observed.

EXAMPLE 24

250 parts (by weight) of CI Pigment Yellow 93 are charged to the container (See FIG. 1). The pigment powder is then fluidized with hot air (100° C.±10° C.) and the outlet temperature allowed to rise to approx. 30° C. 300 parts (by weight) of binder of composition:

0.4% Natrosol 250 HR (Hydroxy ethyl cellulose)
5.8% Dresinol 303 at 100% (an aqueous dispersion of glycerol ester of hydrogenated wood rosin)
2.5% Solumin FIOS at 100% (Sodium salt of polyoxyalkylene condensate)
91.3% water are then sprayed onto the fluidized bed of pigment uniformly over a period of 1½ hours. Fluidization is continued for a further 10 minutes.

The resulting granules, of composition (by weight):
90.5% CI Pigment Yellow 93
0.5% Natrosol 250 HR.
6.3% Dresinol 303 at 100%.
2.7% Solumin FIOS at 100% had a size distribution similar to that obtained in Example 3.

The granules and Original powder were then compared by incorporating equal amounts of pigment into an industrial paint (alkyd melamine) medium.

The resulting paints were then examined and, within practical limits, no differences in application properties were observed.

EXAMPLE 25

250 parts (by weight) of CI Pigment Yellow 93 are charged to the container (See FIG. 1). The pigment powder is then fluidized with hot air (100° C.+10° C.) and the outlet temperature allowed to rise to approx. 30° C. 300 parts (by weight) of binder of composition:

0.4% Klucel M (Hydroxy propyl cellulose)
5.8% Staybelite resin (Hydrogenated wood rosin)
3.5% NH$_3$ solution (SG=0.880)
2.5% Manoxol OT at 100% (Sodium dioctyl sulphosuccinate)
87.8% Water are then sprayed onto the fluidized bed of pigment uniformly over a period of 1½ hours. Fluidization is continued for a further 10 minutes. The resulting granules, of composition (by weight):

90.5% of CI Pigment Yellow 93
0.5% Klucel M
6.3% Staybelite Resin
2.7% Manoxol OT at 100% had a size distribution similar to that obtained in Example 5.

The granules and Original powder were then compared by incorporating equal amounts of pigment into an industrial paint (alkyd melamine) medium, The resulting paints were then examined and, within practical limits, no difference in application properties were observed.

EXAMPLE 26

250 parts (by weight) of CI Pigment Red 48.2 are charged to the container (See FIG. 1). The pigment powder is then fluidized with hot air (100° C.±10° C.) and the outlet temperature allowed to rise to approx. 30° C. 300 parts (by weight) of binder of composition:

0.4% Klucel M (Hydroxy propyl cellulose)
2.5% Lissapol NX (Ethoxylated nonyl phenol)
5.8% Staybelite Resin (Hydrogenated wood rosin)
3.5% NH$_3$ solution (SG=0.880)
87.8% Water are then sprayed onto the fluidized bed of pigment uniformly over a period of 1¼ hours. Fluidization is continued for a further 10 minutes. The resulting granules, of composition (by weight):

90.5% CI Pigment Red 48.2
0.5% Klucel M
6.3% Staybelite Resin
2.7% Lissapol NX had a Dust Index of 6 (Original powder 40) and a size distribution similar to that obtained in Example 3.

The granules and Original powder were then compared by incorporating equal amounts of pigment into an industrial paint medium (alkydmelamine).

The resulting paints were then examined and, within practical limits, no differences in application properties were observed.

EXAMPLE 27

250 parts (by weight) of CI Pigment Red 88 are charged to the container (see FIG. 1). The pigment powder is then fluidized with hot air (100° C.±10° C.) and the outlet temperature allowed to rise to approx. 30° C. 250 parts (by weight) of binder of composition:

- 0.5% Klucel M (Hydroxy propyl cellulose)
- 7.0% Oleyl alcohol
- 3.0% Manoxol OT at 100% (Sodium dioctylsulphosuccinate)
- 89.5% Water are then sprayed onto the fluidized bed of pigment uniformly over a period of 1½ hours. Fluidization is continued for a further 5 minutes. The resulting granules, of composition (by weight)

- 90.5% CI Pigment Red 88
- 0.5% Klucel M
- 6.3% Oleyl alcohol
- 2.7% Manoxol OT at 100% had a size distribution similar to that obtained in Example 4.

The granules and Original powder were then compared by incorporating equal amounts of pigment into an industrial paint (alkyd melamine) medium.

The resulting paints were then examined and, within practical limits, no differences in application properties were observed.

EXAMPLE 28

250 parts (by weight) of CI Pigment Red 144 are charged to the container (see FIG. 1). The pigment powder is then fluidized with hot air (100° C.±10° C.) and the outlet temperature allowed to rise to approx. 30° C. 200 parts (by weight) of binder of composition:

- 1.3% Aldacol at 100% (Polyvinyl pyrrolidone)
- 8.8% Reomol D79P (Dioctyl phthalate)
- 3.8% Lissapol NX (Ethoxylated nonyl phenol)
- 86.1% Water are then sprayed onto the fluidized bed of pigment uniformly over a period of 1 hour. Fluidization is continued for a further 5 minutes. The resulting granules had the following composition (by weight):

- 90.1% CI Pigment Red 144
- 0.9% Aldacol at 100%
- 6.3% Reomol D79P
- 2.7% Lissapol NX and a size distribution similar to that obtained in Example 1. Although the original pigment was already low dusting, the granules produced were free flowing and could easily be metered if desired.

The granules and Original powder were then compared by incorporating equal amounts of pigment into plasticised PVC.

The resulting PVC hides were then examined and, within practical limites, no differences in application properties were observed.

EXAMPLE 29

500 parts (by weight) of CI Pigment Red 101 are charged to the container (see FIG. 1). The pigment powder is then fluidized with hot air (100° C.±10° C. and the outlet temperature allowed to rise to approx. 30° C. 100 parts (by weight) of binder of composition:

- 8.4% Vinapol 1640 at 100% (Potassium salt of polymethacrylic acid)
- 91.6% Water are then sprayed onto the fluidized bed of pigment uniformly over a period of ½ hour. Fluidization is continued for a further 10 minutes. The resulting granules had the following composition (by weight)

- 98.3% CI Pigment Red 101
- 1.7% Vinapol 1640 at 100% had a size distribution similar to that obtained in Example 1. Although the original pigment powder was already low dusting, the granules were free flowing and could easily be metered, if desired.

The granules and Original powder were then compared by incorporating equal amounts of pigment into a decorative (alkyd) paint medium.

The resulting paints were then examined and, within practical limits, no difference in application properties were observed.

EXAMPLE 30

400 parts (by weight) of CI Pigment Red 104 are charged to the container (see FIG. 1). The pigment powder is then fluidized with hot air (100° C.±10° C.) and the outlet temperature allowed to rise to approx. 30° C. 150 parts (by weight) of binder of composition:

- 0.8% Klucel M
- 3.3% Pigment disperser N at 100% (Sodium polyacrylate)
- 12.5% Dresinol 215 at 100% aqueous dispersion of partially Dimerised rosin)
- 83.4% Water are then sprayed onto the fluidized bed of pigment uniformly over a period of ¾ hour. Fluidization is continued for a further 5 minutes. The resulting granules, of composition (by weight):

- 94.1% CI Pigment Red 104
- 0.3% Klucel M
- 1.2% Pigment disperser N at 100%
- 4.4% Dresinol 215 at 100% had a size distribution similar to that obtained in Example 3. Although etc (see Example 29).

The granules and Original powder were then compared by incorporating equal amounts of pigment into a decorative (alkyd) paint medium.

The resulting paints were then examined and, within practical limits, no differences in application properties were observed.

EXAMPLE 31

500 parts (by weight) of CI Pigment Red 101 are charged to the container (see FIG. 1). The pigment powder is then fluidized with hot air (100° C.±10° C.) and the outlet temperature allowed to rise to approx. 30° C. 150 parts (by weight) of binder of composition:

- 0.8% Klucel M (Hydroxy propyl cellulose)
- 3.3% Pigment disperser N at 100% (Sodium polyacrylate)
- 12.5% Dresinol 215 at 100% (aqueous dispersion of partially Dimerised resin)
- 83.4% Water are then sprayed onto the fluidized bed of pigment uniformly over a period of ½ hour. Fluidization is continued for a further 5 minutes. The resulting granules, of composition (by weight):

- 95.2% CI Pigment Red 101
- 0.2% Klucel M
- 3.6% Dresinol 215 at 100%
- 1.0% Pigment dispersion N at 100% had a size distribution similar to that obtained in Example 3. Although etc. (see Example 29).

The granules and Original powder were then compared by incorporating equal amounts of pigment into a decorative (alkyd) paint medium.

The resulting paints were then examined and, within practical limites, no differences in application properties were observed.

EXAMPLE 32

250 parts (by weight) of CI Pigment Red 144 are charged to the container (See FIG. 1). The pigment powder is then fluidized with hot air (100° C.±10° C.) and the outlet temperature allowed to rise to approx. 30° C. 100 parts (by weight) of binder of composition:
- 2.5% ALDACOL at 100% (POLYVINYL PYRROLIDONE)
- 4.0% CARBOWAX 4000 (POLYETHYLENE GLYCOL)
- 4.0% NOPCOTE 104HS at 100% (Aqueous dispersion of CALCIUM STEARATE)
- 3.8% LISSAPOL NX (ETHOXYLATED NONYL PHENOL)
- 85.7% WATER are then sprayed onto the fluidized bed of pigment uniformly over a period of ¾ hour. Fluidization is continued for a further 10 minutes. The resulting granules, of composition (by weight).
- 94.6% CI Pigment Red 144
- 1.0% ALDACOL at 100%
- 1.5% NOPCOTE 104HS at 100%
- 1.5% CARBOWAX 4000
- 1.4% LISSAPOL NX had a size distribution similar to that obtained in Example 1 and were free flowing and could be metered if desired. The granules and Original powder were then compared by incorporating equal amounts of pigment into plasticised PVC. The resulting PVC hides were then examined and, within practical limits, no differences in application properties were observed.

EXAMPLE 33

250 parts (by weight) of CI Pigment Yellow 62.1 are charged to the container (see FIG. 1). The pigment powder is then fluidized with hot air (100° C.±10° C.) and the outlet temperature allowed to rise to approx. 30° C. 230 parts (by weight) of binder of composition:
- 1.1% ALDACOL at 100% (POLYVINYL PYRROLIDONE)
- 14.1% REOMOL D79P (DIOCTYL PHTHALATE)
- 5.4% LUTOFAN 100D at 100% (Aqueous dispersion of PVC)
- 1.1% SOLUMIN F10S at 100% (Na salt of sulphated polyoxyalkylene condensate)
- 78.3% WATER are then sprayed onto the fluidized bed of pigment uniformly over a period of 1½ hours. Fluidization is continued for a further 10 minutes. The resulting granules, of composition (by weight)
- 83.4% CI Pigment Yellow 62.1
- 0.8% ALDACOL at 100%
- 10.85 REOMOL D79P
- 4.2% LUTOFAN 100D at 100%
- 0.8% SOLUMIN F10S at 100% had a Dust Index of 1. (Original powder 13) and a size distribution similar to that obtained in Example 3. The granules and Original powder were then compared by incorporating equal amounts of pigment into plasticised PVC. The resulting PVC hides were then examined and, within practical limits, no differences in application properties were observed.

EXAMPLE 34

250 parts (by weight) of CI Pigment Yellow 13 are charged to the container (See FIG. 1). The pigment powder is then fluidized with hot air (100° C.±10° C.) and the outlet temperature allowed to rise to approx. 30° C. 250 parts (by weight) of binder of composition:
- 8.0% DRESINOL 303 at 100% (Aqueous dispersion of Glycerol ester of hydrogenated wood rosin)
- 2.0% SOLUMIN F10S at 100% (Na salt of sulphated polyoxyalkylene condensate)
- 1.0% VINAPOL 1640 at 100% (K salt of polymethacrylic acid)
- 89.0% WATER are then sprayed onto the fluidised bed of pigment uniformly over a period of 1 hour. Fluidization is continued for a further 15 minutes, during which time 12.5 parts (by weight) of process oil are sprayed onto the fluidized bed of pigment. The resulting granules, of composition (by weight)
- 86.2% CI Pigment Yellow 13
- 6.9% DRESINOL 303 at 100%
- 1.7% SOLUMIN F10S at 100%
- 0.9% VINAPOL 1640 at 100%
- 4.3% PROCESS OIL had a Dust Index of 10 (Original powder 33) and a size distribution similar to that obtained in Example 2. The granules and Original powder were then compared by incorporating equal amounts of pigment into an industrial paint medium (Alkyd Melamine). The resulting paints were then examined and, within practical limits, no differences in application properties were observed.

EXAMPLE 35

250 parts (by weight) of CI Pigment Blue 15.3 are charged to the container (See FIG. 1). The pigment powder is then fluidized with hot air (100° C.±10° C.) and the outlet temperature allowed to rise to approx. 30° C. 400 parts (by weight) of binder of composition:
- 1.9% ATLOX 1087 (POLYOXYETHYLENE SORBITAN OLEATE)
- 0.6% LISSAPOL NX (ETHOXYLATED NONYL PHENOL)
- 0.6% KLUCEL 'M' (HYDROXY PROPYL CELLULOSE)
- 96.9% WATER are then sprayed onto the fluidized bed of pigment uniformly over a period of 2 hours. Fluidization is continued for a further 15 minutes during which time 12.5 parts (by weight) of process oil are sprayed onto the fluidised bed of pigment. The resulting granules, of composition (by weight).
- 90.9% CI Pigment Blue 15,3
- 2.7% ATLOX 1087
- 0.9% LISSAPOL NX
- 0.9% KLUCEL M
- 4.6% PROCESS OIL had a Dust Index of 5 (Original powder 45) and a size distribution similar to that obtained in Example 5. The granules and Original powder were then compared by incorporating equal amounts of pigment into an industrial paint medium (Alkyd Melamine). The resulting paints were then examined and, within practical limits, no differences in application properties were observed.

EXAMPLE 36

250 parts (by weight) of CI Pigment Red 177 are charged to the container (See FIG. 1). The pigment powder is then fluidized with hot air (100° C. ± 10° C.) and the outlet temperature allowed to rise to approx. 30° C. 500 parts (by weight) of binder of composition:

1.5% ATLOX 1087 (POLYOXYETHYLENE SORBITAN OLEATE)
0.5% LISSAPOL NX (ETHOXYLATED NONYL PHENOL)
0.5% KLUCEL 'M' (HYDROXY PROPYL CELLULOSE)
97.5% WATER are then sprayed onto the fluidized bed of pigment uniformly over a period of 2 hours. Fluidization is continued for a further 15 minutes during which time 12.5 parts (by weight) of process oil are sprayed onto the fluidised bed of pigment. The resulting granules, of composition (by weight)

90.9% CI Pigment Red 177
2.7% ATLOX 1087
0.9% LISSAPOL NX
0.9% KLUCEL 'M'
4.6% PROCESS OIL had a Dust Index of 16 (Original powder 23) and a size distribution similar to that obtained in Example 4. The granules and Original powder were then compared by incorporating equal amounts of pigment into an industrial paint medium (Alkyd Melamine). The resulting paints were then examined and, within practical limits, no differences in application properties were observed.

What we claim is:

1. A process for producing a substantially dry, low-dusting, free-flowing granular pigment product in individual batches comprising:
   (a) forming a fluidized bed consisting essentially of blowing a stream of gas upwardly through a bed of pigment powder;
   (b) dispensing onto the fluidized bed of pigment (i) water and (ii) a granulating assistant selected from the group consisting of nonionic-, cationic- and anionic surface-active agents, binders and applicational aids, said applicational aid being selected from the group consisting of abietic acid, an ester of abietic acid, polyethylene glycol 4000, diglycol monostearate, cellulose acetobutyrate, an alkaline earth metal salt of a fatty acid containing 12 to 20 carbon atoms, a fatty alcohol, an amine containing 12 to 20 carbon atoms, a vinyl chloride polymer, a vinyl chloride/vinyl acetate copolymer, polyethylene, a polyacrylonitrile resin, a polyterpene resin, dioctyl phthalate, dicyclohexyl phthalate, a triglyceride of 12-hydroxystearic acid, a maleic-modified resin, a phenolic-modified resin, a wood rosin modified by hydrogenation, a wood rosin modified by polymerization and a glyceryl ester of a modified resin, said assistant being one which:
   ($\alpha$) wets the pigment powder surface sufficiently to allow agglomeration of pigment particles in said fluidized bed; and
   ($\beta$) binds granules so formed sufficiently to enable them to resist breakdown during the process and during subsequent handling and storage; and
   (c) recovering the granular pigment so formed.

2. A process according to claim 1 wherein, prior to step (a), the pigment is subjected to a dry grinding process.

3. A process according to claim 1 wherein the nonionic surface-active agent is selected from the group consisting of (a) monoethers of polyglycols with fatty alcohols containing 12-18 carbon atoms, (b) monoesters of polyglycols with fatty acids containing 12-18 carbon atoms, (c) monoethers of polyglycols with alkyl phenols containing 6-12 carbon atoms, (d) N,N-polyethoxylated fatty amines containing 12-18 carbon atoms, (e) N,N'-polyethoxylated fatty acid amides containing 12-18 carbon atoms, (f) ester/ethers of polyglycols with cyclic alcohols and fatty acids, (g) condensation products of polyglycols and (h) glycols of alkynes.

4. A process according to claim 1 wherein the cationic surface-active agent is selected from the group consisting of primary-, secondary- and tertiary amines and alkyl propylene diamines.

5. A process according to claim 1 wherein the anionic surfactant is selected from the group consisting of alkali metal-, ammonium- and amine salts of fatty carboxylic acids; alkali metal-, ammonium- and amine salts of sulphonic acids; and fatty amine sulphates.

6. A process according to claim 5 wherein the anionic surfactant is the ammonium salt of partly hydrogenated wood rosin.

7. A process according to claim 1 wherein the binder is an anionic or nonionic water-soluble polymeric agent.

8. A process according to claim 7 wherein the polymeric agent is selected from the group consisting of hydroxyethyl cellulose, hydroxypropyl cellulose, sodium carboxymethyl cellulose, polyvinyl alcohol and polyvinyl pyrrolidone.

9. A process according to claim 1 wherein the amount of the granulating assistant used is from 0.5 to 20% by weight, based on the weight of the pigment to be treated in the process.

10. A process according to claim 1 wherein the granulating assistant is used as an aqueous solution, emulsion or dispersion.

11. A process according to claim 10 wherein the granulating assistant is dispersed in a concentration such that the weight ratio of water to granulating assistant is from 99.5:0.5 to 40:60.

12. The process of claim 1, wherein the fluidized bed formed in step (a) consists essentially of said pigment powder blended with said granulating assistant and, in step (b), water is dispensed onto said fluidized bed.

13. The process of claim 1, wherein the fluidized bed formed in step (a) consists essentially of said pigment powder blended with a portion of the total concentration of said granulating assistant and, in step (b), water and the remainder of said total granulating assistant concentration is dispensed onto said bed.

14. A process according to claim 1, wherein, prior to step (a), the pigment is subjected to a sieving process.

* * * * *